D. T. WALSH.
BACK-UP BRAKE FOR VEHICLES.
APPLICATION FILED DEC. 8, 1911.
1,021,854.
Patented Apr. 2, 1912.
2 SHEETS—SHEET 1.
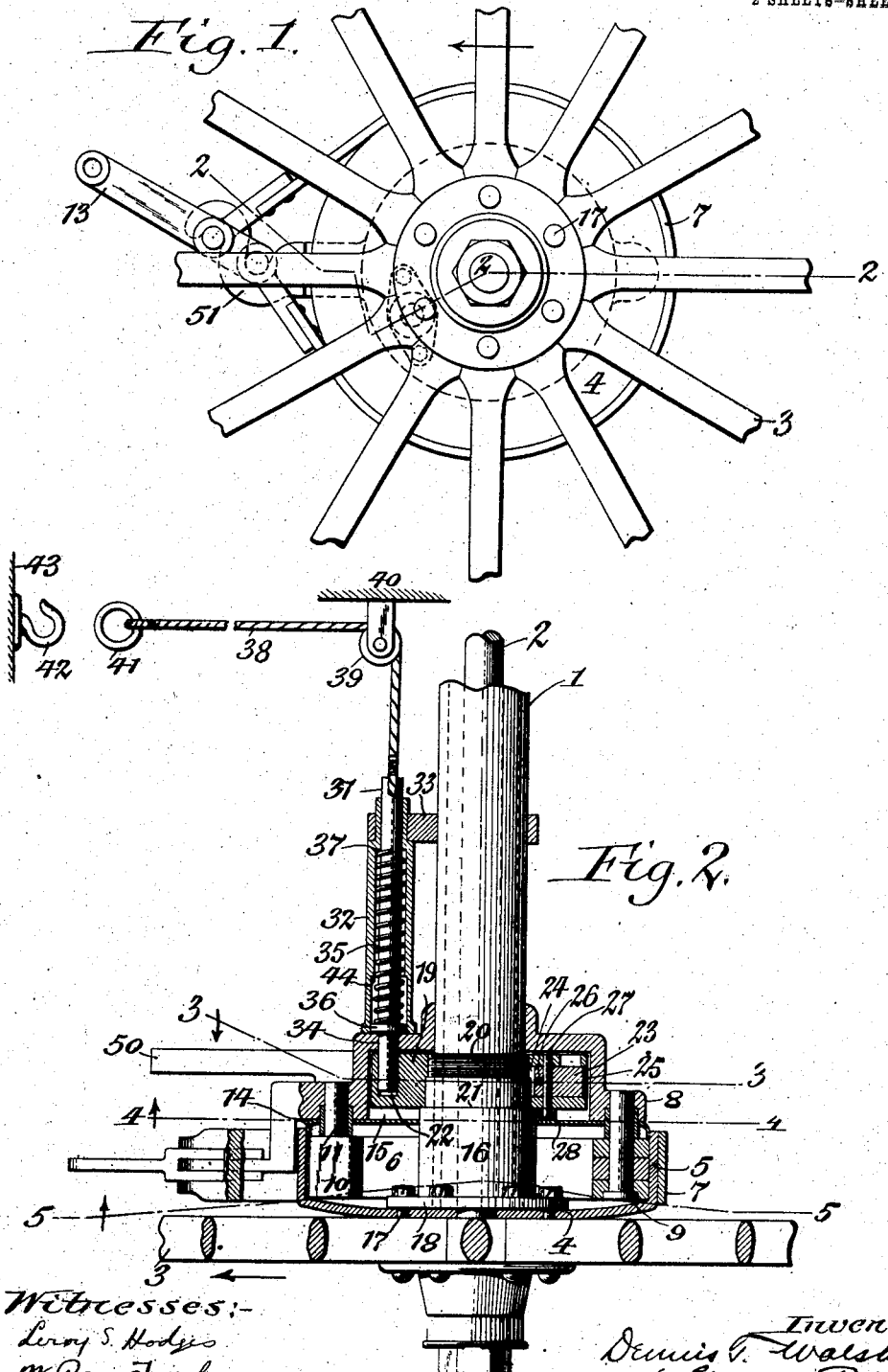

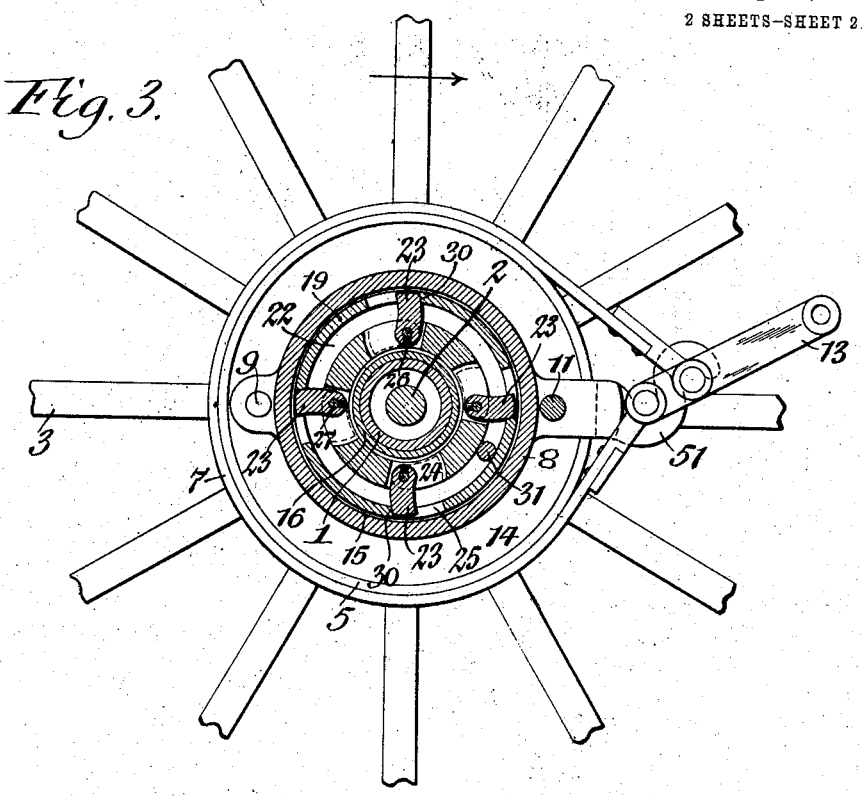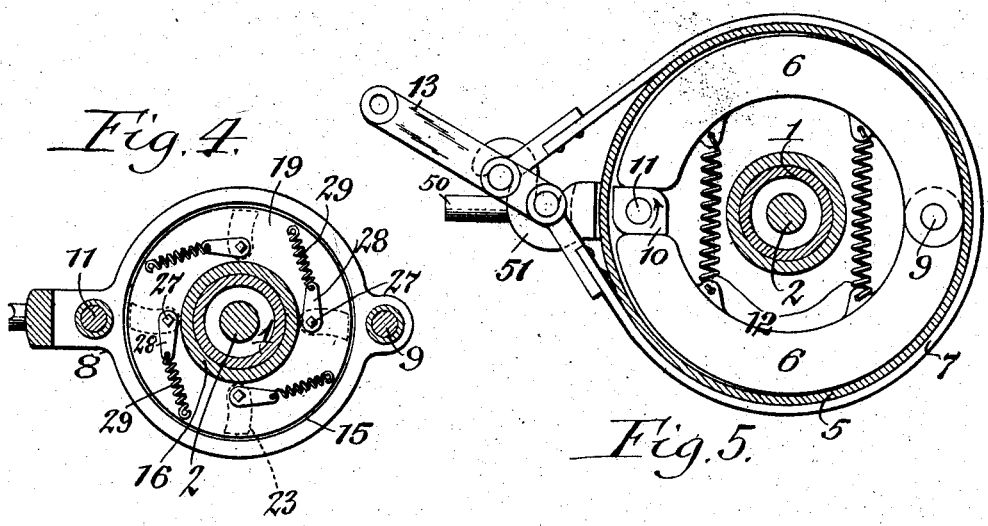

UNITED STATES PATENT OFFICE.

DENNIS T. WALSH, OF ANSONIA, CONNECTICUT.

BACK-UP BRAKE FOR VEHICLES.

1,021,854. Specification of Letters Patent. Patented Apr. 2, 1912.

Application filed December 8, 1911. Serial No. 664,539.

*To all whom it may concern:*

Be it known that I, DENNIS T. WALSH, a citizen of the United States, residing at Ansonia, in the county of New Haven and State of Connecticut, have invented new and useful Improvements in Back-Up Brakes for Vehicles, of which the following is a specification.

This invention relates to a back-up brake which is more particularly designed for use on automobiles and other vehicles to prevent the same from backing down hill either when the power of the engine gives out or is insufficient to propel the vehicle up hill or other cause, thereby preventing injury to the vehicle and also to the passengers as has frequently occurred in the past under such circumstances.

The object of this invention is to provide a back-up brake of this character which is simple and comparatively inexpensive in construction, which is reliable and efficient in operation and which can be applied to automobiles as now constructed without requiring any material change in design for receiving my improvements.

In the accompanying drawings consisting of 2 sheets: Figure 1 is a fragmentary side elevation of one of the driving wheels of the automobile and adjacent parts equipped with my improved back up brake. Fig. 2 is a horizontal section in line 2—2, Fig. 1. Figs. 3, 4 and 5 are transverse sections in the correspondingly numbered lines in Fig. 2 and looking in the directions of the arrows associated with these lines.

Similar characters of reference indicate corresponding parts throughout the several views.

1 represents the hollow or tubular axle housing, 2 the driving axle journaled in the axle housing and 3 one of the driving wheels secured to the outer end of the axle.

4 represents the brake drum which is secured to the inner side of the wheel around the axle housing and which is engaged on the inner side of its annular brake flange 5 by a pair of internal brake shoes 6 and on its periphery by a brake band 7. Adjacent to the inner side of this brake drum is arranged a main supporting bracket 8 which is secured to the adjacent part of the axle housing by brazing or any other suitable manner so that it is rigid or stationary. One pair of ends of the internal brake shoes are pivoted by means of a pin 9 to this bracket on one side of the axle housing while their opposite ends are engaged by a cam 10 mounted on a shaft 11 journaled in a bearing on the bracket on the opposite side of the axle housing and provided with an oscillating lever 50 on the inner side of a bracket, as shown in Figs. 2 and 5. Upon turning the cam in the direction of the arrow in Fig. 5 the brake shoes are expanded into engagement with the bore of the brake drum and upon releasing this cam the brake shoes are retracted out of engagement with the brake drum by means of springs 12 connecting the same. One end of the brake band is attached to the inner end of a lever 13 which is fulcrumed on an arm 51 projecting laterally from the main bracket while the other end of this strap is connected with this brake lever at a distance from its fulcrum so that upon turning this lever in one direction the brake band is tightened upon the periphery of the drum while upon turning the same in the opposite direction the band is loosened.

14 represents a dust plate or guard arranged on the outer side of the main bracket and engaging with the inner side of the brake drum for the purpose of excluding dust, dirt and water from the interior of the brake drum.

The foregoing parts are of well known construction and form no part of this invention.

My improved back-up brake is preferably associated with the above described parts of the automobile and is constructed as follows:

15 represents a cylindrical chamber or pocket formed in the outer side of the main supporting bracket around the axle housing, this chamber being preferably formed by inwardly dishing or extending the central part of the main bracket, as shown in Figs. 2 and 3.

16 represents a coupling tube or sleeve surrounding the outer end of the axle housing and connected with the driving wheel 3 so as to turn therewith by means of bolts 17 or other fastenings passing through the hub of the wheel and through an annular external flange 18 arranged on the outer end of the coupling sleeve, as shown in Fig. 2. On the inner end of the coupling sleeve is arranged a clutch 19 which preferably has the form of an annular head or disk. This clutch disk may be secured to the coupling sleeve by any suitable means but preferably by means of an external screw thread 20 formed on the inner end of a coupling sleeve and engaging with an internal screw thread formed in the bore of a central opening in the clutch disk. The outer side of the clutch disk preferably bears against an inwardly facing annular shoulder 21 on the coupling sleeve in the assembled position of the parts for the purpose of limiting the outward movement of the clutch disk on the coupling sleeve and facilitating outward assembling of the parts. On the inner side of the clutch disk which faces the bottom of the chamber or pocket in the main bracket this disk is provided with an annular groove or passageway 22.

23 represents a plurality of brake pawls each of which is adapted to move either into a position in which it extends across the annular groove or passage in the clutch disk or to clear the same. Four of such brake pawls are shown arranged equidistant around the clutch disk but a greater or lesser number may be employed if desired. Each of these brake pawls is arranged at its inner end in an opening or recess 24 formed in the clutch disk on the inner side of its annular groove and its outer end is normally arranged in a recess or opening 25 formed in the clutch disk on the outer side of said groove. At its inner end each brake pawl is secured by means of a clamping screw 26 or otherwise to a pivot pin 27 which is journaled in bearings arranged on the adjacent part of the clutch disk on one side of the axis of the latter. On the outer end of the pivot pin of each brake pawl is secured a rock arm 28 which is connected with the adjacent part of the clutch disk by means of a spring 29, as shown in Fig. 4. The function of this spring is to yieldingly hold its companion brake pawl in a position in which it projects across the passageway or groove of the clutch disk and engages with the front end 30 of its companion outer recess 25 which operates as a stop to limit the movement of this brake pawl in this direction. Under the circumstances which will be presently described the brake pawl is shifted from the laterally projecting position across the clutch groove, shown in full lines in Fig. 3, to a position in which it clears said groove and is arranged wholly within the inner recess of the clutch disk, as shown by dotted lines in the same figure.

31 represents a brake rod or member which is adapted to coöperate with the brake pawls and prevent the automobile from backing up but permit the same to move freely ahead. This brake rod is arranged lengthwise on one side of the axle housing and inclosed for the greater part of its length by means of a tubular casing 32 which is secured at its outer end to the inner side of the main bracket while its inner end is supported upon the adjacent part of the axle housing by means of an auxiliary bracket 33 which rigidly connects these parts. The outer end of the brake rod passes through a guide opening 34 formed in the main bracket in line with the annular groove of the clutch disk while the inner end of this rod is guided in the inner end of the casing inclosing frame. The brake rod when free is moved outwardly lengthwise by means of a spring 35 surrounding this rod within its casing and bearing at one end against a collar 36 arranged near the outer end of the brake rod while its opposite end bears against an internal shoulder 37 formed at the inner end of the casing. In its outwardly projected position the brake rod is arranged within the annular groove of the clutch disk and its movement in this direction is limited by means of the collar 36 thereof engaging with the adjacent outer side of the main supporting bracket. In its inwardly retracted position the brake rod is withdrawn from the annular groove of the clutch disk which withdrawal may be effected in any suitable manner, the means for this purpose shown in the drawings being suitable and consisting of a cable, cord or similar shifting member 38 passing with its intermediate part around a pulley or guide roller 39 arranged on the body 40 of the automobile and one end of the rope or cord being connected with the inner end of the brake rod while the other end thereof extends to some point within convenient reach of the chauffeur where suitable means may be provided for holding the cord in a position in which the brake rod is retained out of the groove of the clutch disk. The means for this purpose shown in Fig. 2, for example, consist of a ring 41 arranged on the retracting cable 38 and adapted to engage with a stationary hook 42 on the dash board 43 of the vehicle body. The backward movement of the brake rod may be limited by various means, for instance, by an internal stop shoulder 44 on the casing 32 which is arranged to be engaged by the collar 36.

When the automobile or other vehicle to which the back-up brake is applied moves over a level ground the brake rod 31 is withdrawn inwardly so that its outer end does not project into the path of the brake pawls 23, this rod being held in this position as long as desired by engaging the ring 41 on the shifting cord 38 with the hook 42 on the dash of the automobile body. In this position of the parts the clutch disk rotates forwardly with the wheel, the direction of this movement being indicated by the arrow in Figs. 1, 2 and 3. The brake pawls at this time also are yieldingly held by their springs 29 in a position in which they extend across the clutch groove 22 and engage their outer ends with the stop shoulders 30 at the front ends of the outer recesses. When the car is about to climb a hill or steep part of the roadway the chauffeur releases the brake rod so as to permit its spring to project the same into the annular groove of the clutch disk, as shown in Figs. 2 and 3. If the automobile continues to travel up the hill while the brake rod is thus projected into the annular groove of the clutch each of the brake pawls will in turn engage with the outer end of the brake rod and be deflected thereby into its companion inner recess when passing the brake rod, whereby the spring 29 associated with this pawl will be strained so that after the pawl trips past the brake rod and again clears the same during its continued rotary movement with the driving wheel and clutch disk the resilience of this spring will again turn the pawl into its normal operative position in which it projects across the annular groove of the clutch disk and into engagement with its outer stop shoulder. Should the automobile begin to back down hill, due to the failure of the engine or other cause, the brake rod will be engaged by the first brake pawl 23 in rear of the same, which pawl being in engagement with its stop shoulder 30 is at this time held rigidly in place and therefore positively arrests the further backward movement of the clutch disk and the driving wheel connected therewith, thereby stopping the backward movement of the automobile. By providing a plurality of such pawls which are arranged at different points relative to the circumference of the clutch disk the extent of backward movement which the automobile wheels can make at any time is comparatively short, thereby arresting this movement before the automobile acquires any speed in a backward direction and guarding against the breakage of any parts which would be liable to occur if it were attempted to arrest the backing up of the automobile while the same is moving at a comparatively high speed. This liability of breakage is further reduced by reason of the fact that each of the brake pawls is supported at both of its ends on the clutch disk and on opposite sides of the annular groove, thereby producing a very strong and durable construction which is able to withstand the severest shocks to which the same is liable to be subjected. After the backing up of the automobile has thus been arrested and the engine again propels the same forwardly up the hill no further attention need be given the back-up brake, inasmuch as the driving wheel and clutch disk are free to turn forwardly at this time but so long as the brake rod is in its operative position the parts are always ready to again arrest the backward movement of the automobile if this should again become necessary.

A back-up brake of this construction may be applied to either one or more of the wheels of the automobile, one of such brakes being usually sufficient for a comparatively light car but for heavy automobiles or trucks it is desirable to apply one of these back-up brakes to each of the rear driving wheels.

Inasmuch as this back-up brake does not require any material change in the design of the running gear of an automobile it is capable of easy application to all automobiles of standard construction. Furthermore, all of its main working parts are concealed from view so that the same is neat in appearance and is not liable to be interfered with by dirt, dust or rain and is therefore always in condition for use when the emergency arises.

I claim as my invention:

1. A back-up brake for vehicles comprising a clutch disk rotating with a wheel of the vehicle and provided with a brake pawl movable relatively to the clutch disk, and a brake member mounted on a stationary part of the vehicle and movable into and out of the path of said pawl.

2. A back-up brake for vehicles comprising a clutch disk rotatable with a wheel of the vehicle and provided with an annular groove, a brake-pawl movably mounted on said disk and adapted to either project into said groove or clear the same, and a brake rod mounted on a stationary part of the vehicle and movable into and out of said groove of the disk.

3. A back-up brake for vehicles comprising a clutch disk rotatable with a wheel of the vehicle provided with an annular groove, a brake-pawl movably mounted on said disk and adapted to either project into said groove or clear the same, means for yieldingly holding said pawl across said groove, and a brake rod mounted on a stationary part of the vehicle and movable into and out of said groove of the disk.

4. A back-up brake for vehicles comprising a clutch disk rotating with a wheel of the vehicle and provided with an annular groove, a brake pawl normally arranged across said groove and supported on said disk on opposite sides of said groove and movable out of said groove, and a brake rod mounted on a stationary part of the vehicle and movable into and out of said groove so as to engage or clear said pawl.

5. A back-up brake for vehicles comprising a clutch disk rotating with a wheel of the vehicle and provided with an annular groove, a brake pawl normally arranged across said groove and supported on said disk on opposite sides of said groove and movable out of said groove, means for yieldingly holding the pawl in its normal position, and a brake rod mounted on a stationary part of the vehicle and movable into and out of said groove so as to engage or clear said pawl.

6. A back-up brake for vehicles comprising a clutch disk rotating with a wheel of the vehicle and provided with an annular groove, an inner recess arranged on the inner side of said groove and an outer recess arranged on the outer side of said groove, a brake pawl pivoted at its inner end in said disk within said inner recess and adapted to project across said groove into said outer recess, and a brake member mounted on a stationary part of the vehicle and movable into and out of the path of said pawl.

7. A back-up brake for vehicles comprising a clutch disk rotating with a wheel of the vehicle and provided with an annular groove, an inner recess arranged on the inner side of said groove and an outer recess arranged on the outer side of said groove, a brake pawl pivoted at its inner end on said disk within said inner recess and adapted to project across said groove into said outer recess, a shaft which is journaled on said disk and to which said pawl is secured, a rock arm mounted on said shaft, a spring connecting said arm with said disk, and a brake member mounted on a stationary part of the vehicle and movable into and out of the path of said pawl.

8. A back-up brake for vehicles comprising a clutch disk rotating with a wheel of the vehicle, a brake pawl movably mounted on said disk, a brake member mounted on a stationary part of the vehicle and movable into its operative position in the path of said pawl, and means for yieldingly holding said brake member in its operative position.

9. A back-up brake for vehicles comprising a clutch disk rotating with a wheel of the vehicle, a brake pawl movably mounted on said disk, a brake member mounted on a stationary part of the vehicle and movable into its operative position in the path of said pawl, a casing in which said brake member is guided, and a spring arranged in said casing and operating to move said rod into its operative position.

10. A back-up brake for vehicles comprising a clutch disk rotating with a wheel of the vehicle, a brake pawl movably mounted on said disk, a brake member mounted on a stationary part of the vehicle and movable into its operative position in the path of said pawl, a casing in which said brake member is guided, a spring arranged in said casing and operating to move said rod into its operative position, and a retracting member connected with said rod.

11. In a back-up brake for vehicles, the combination of an axle, a wheel secured to the axle, a housing surrounding the axle, a coupling sleeve surrounding said housing and connected with said wheel, a clutch disk mounted on said sleeve and provided with a brake pawl, and a brake member mounted on a stationary part of the vehicle and movable into and out of the path of said pawl.

12. In a back-up brake for vehicles, the combination of an axle, a wheel secured to the axle, a housing surrounding the axle, a coupling sleeve surrounding said housing and connected with said wheel, a clutch disk mounted on said sleeve and provided with a brake pawl, a bracket mounted on said housing and provided with a chamber in which said clutch disk rotates, a guide mounted on said bracket, and a brake rod mounted in said guide and movable into and out of the path of said pawl.

Witness my hand this 4th day of December, 1911.

DENNIS T. WALSH.

Witnesses:
 IRA F. HOYT,
 MICHAEL L. BRANDON.

---

Copies of this patent may be obtained for five cents each, by addressing the "Commissioner of Patents, Washington, D. C."